United States Patent

Choi

[11] Patent Number: 5,874,715
[45] Date of Patent: Feb. 23, 1999

[54] HEATING APPARATUS IN THE FORM OF AN ANTENNA ARRAY PLATE FOR A MICROWAVE OVEN

[75] Inventor: Joon Sik Choi, Seoul, Rep. of Korea

[73] Assignee: LG Electronics Inc., Rep. of Korea

[21] Appl. No.: 903,131

[22] Filed: Jul. 30, 1997

[30] Foreign Application Priority Data

Jul. 31, 1996 [KR] Rep. of Korea .................. 1996-31878

[51] Int. Cl.⁶ ..................................... H05B 6/74
[52] U.S. Cl. ........................... 219/746; 219/745; 219/748
[58] Field of Search ................... 219/746, 748, 219/749, 750, 691, 693, 695, 696, 697, 745

[56] References Cited

U.S. PATENT DOCUMENTS

| | | | |
|---|---|---|---|
| 2,562,911 | 8/1951 | Hare | 219/691 |
| 2,704,802 | 3/1955 | Blass et al. | 219/748 |
| 3,263,052 | 7/1966 | Jeppson et al. | 219/726 |
| 3,430,022 | 2/1969 | Cougoule | 219/746 |
| 3,810,248 | 5/1974 | Risman et al. | 219/746 |
| 4,210,793 | 7/1980 | Fournet-Fayas | 219/748 |
| 4,354,083 | 10/1982 | Staats | 219/746 |

FOREIGN PATENT DOCUMENTS

| | | | |
|---|---|---|---|
| 54-162246 | 12/1979 | Japan | 219/748 |
| 1407852 | 9/1975 | United Kingdom | 219/748 |

*Primary Examiner*—Philip H. Leung
*Attorney, Agent, or Firm*—Ostrolenk, Faber, Gerb & Soffen, LLP

[57] ABSTRACT

An even heating apparatus for converting microwave energy emitted from a magnetron to a plurality of resonant modes in a heating chamber of a microwave oven for thereby evenly heating the food in the heating chamber includes an antenna array plate including a plurality of antennas therein. The apparatus evenly heats food in the heating chamber by fixing the antenna array plate having multiple antennas therein spaced from the ceiling of the heating chamber.

5 Claims, 4 Drawing Sheets

HEATING APPARATUS IN THE FORM OF AN ANTENNA ARRAY PLATE FOR A MICROWAVE OVEN

BACKGROUND OF THE INVENTION

1. Field of the Invention

The present invention relates to a microwave oven, and more particularly to an even heating apparatus for a microwave oven capable of evenly applying microwaves emitted from a magnetron to food by providing an antenna array plate inside a heating chamber thereof.

2. Description of the Prior Art

With reference to FIG. 1 illustrating a microwave oven according to the conventional art, the microwave oven includes a box-shaped heating chamber 1 on an internal portion of which is mounted a magnetron 2 which emits microwaves.

Outside a side wall 3 of the heating chamber 1 there is vertically provided a wave guide compartment 4 for guiding microwaves emitted from the magnetron 2. Through the side wall 3 there are formed a plurality of slots 5 for introducing the microwaves therethrough. A table rotating motor 6 is provided below the bottom of the heating chamber 1. A rotation table 7 is mounted extending from the bottom of the heating chamber 1. On the upper surface of the rotation table 7 there is provided a tray 8 for placing food thereon.

An agitation motor 9 is mounted atop the heating chamber 1. An agitation fan 10 is mounted on a shaft of the motor 9 extending downwardly from a ceiling of the heating chamber 1 for thereby agitating the microwaves introduced through the slots 5 into the heating chamber 1.

FIG. 2 illustrates an imaginary perspective view of the chamber 1 and is provided to denote respective dimensions L1, L2, L3 of the heating chamber 1.

The operation of the thusly constituted microwave oven according to the conventional art will now be described.

First, when current is applied to the magnetron 2, microwaves are emitted from the magnetron 2, and at the same time the rotation table motor 6 and the agitation motor 9 are activated.

The microwave energy emitted from the magnetron 2 is guided along the wave guide compartment 4 and introduced through the slots 5 into the heating chamber 1. Then, the microwave energy flowing into the heating chamber 1 is rendered to a variety of resonance mode frequencies in accordance with rotation of the agitation fan 10, for thereby heating the food on the tray 8.

At this time, the food being rotated on the tray 8 shows a different aspect depending on the size or kind of food in terms of a heating degree.

With reference to FIGS. 3A through 3C, the food heating degrees will now be described.

FIG. 3A is a spectrum graph illustrating a case in which respective dimensions L1, L2, L3 of the heating chamber 1 are respectively less than a wave length $\lambda_m$ of an oscillation frequency outputted from the magnetron 2 and it shows that because there do not occur any resonant modes the food in the chamber 1 is not evenly heated.

Further, FIG. 3B is a spectrum graph illustrating a case in which respective dimensions L1, L2, L3 of the heating chamber 1 are respectively nearly equal or equal to a wave length $\lambda_m$ of an oscillation frequency outputted from the magnetron 2, wherein because there exists only a single resonant mode the food in the chamber 1 is heated only in a particular portion thereof.

Still further, FIG. 3C is a spectrum graph illustrating a case in which respective dimensions L1, L2, L3 of the heating chamber 1 are respectively longer than a wave length $\lambda_m$ of an oscillation frequency outputted from the magnetron 2, wherein because there exist a plurality of resonant modes the food in the chamber 1 is heated in a confined portion of the food.

However, in consideration of a relation between respective dimensions and resonant modes, when the respective dimensions of the heating chamber 1 are less than or almost equal to a wave length $\lambda_m$ of an oscillation frequency outputted from the magnetron 2, the food in the chamber 1 is not evenly heated regardless of the rotation of the agitation fan 10 and the table 7.

Further, when the respective dimensions of the heating chamber 1 are longer than a wave length $\lambda_m$ of an oscillation frequency from the magnetron 2, heating of the food in the chamber 1 is confined to a particular portion thereof in terms of an even heating, thereby making it difficult to heat food at a constant heating rate irrespective of the size, weight and the like of the food.

SUMMARY OF THE INVENTION

Accordingly, it is an object of the present invention to provide an even heating apparatus for a microwave oven which makes it possible to evenly apply microwave energy emitted from a magnetron to food by providing an antenna array plate in a portion of a heating chamber thereof.

To achieve the above-described object, an even heating apparatus for rendering microwave energy emitted from a magnetron in a plurality of resonant modes in a heating chamber of a microwave oven according to the present invention includes an antenna array plate having a plurality of antennas therein for thereby evenly heating the food in the heating chamber.

DETAILED DESCRIPTION OF THE INVENTION

Figure 1:
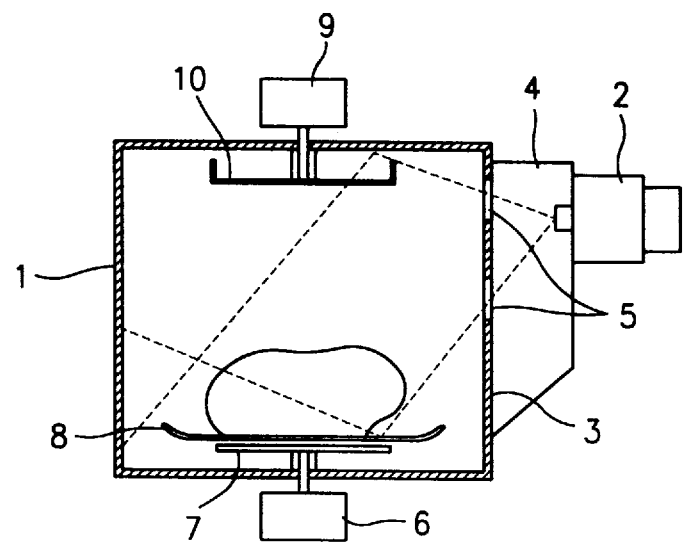
FIG. 1 is a cross-sectional view of a microwave oven according to the conventional art.
Figure 2:
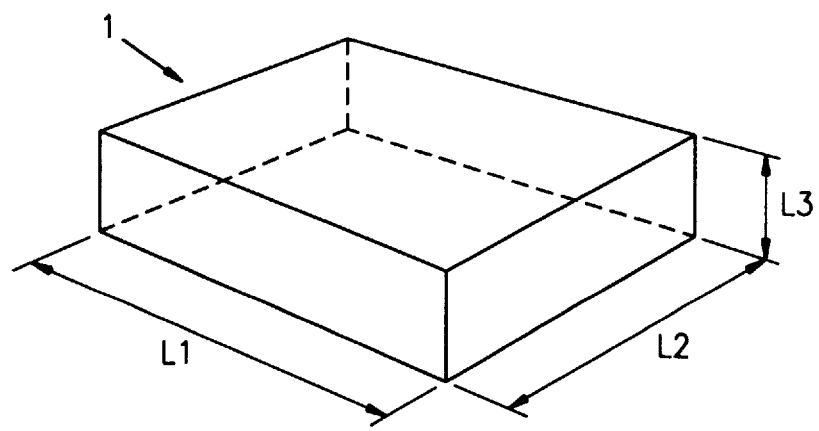
FIG. 2 is a perspective view illustrating dimensions of a heating chamber in the microwave oven of FIG. 1.
Figure 3A:
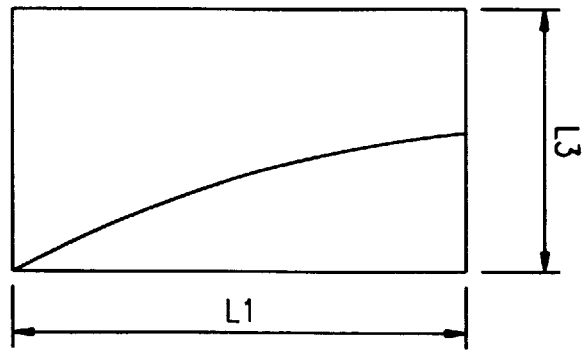
FIG. 3A is a spectrum graph illustrating a case in which respective dimensions L1, L2, L3 of the heating chamber are respectively less than a wave length of an oscillation frequency from a magnetron.
Figure 3B:
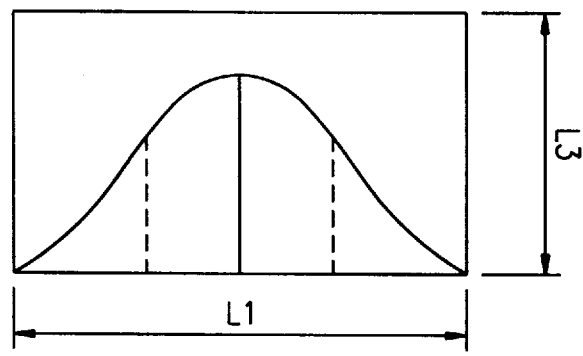
FIG. 3B is a spectrum graph illustrating a case in which respective dimensions L1, L2, L3 of the heating chamber are respectively almost equal or equal to a wave length of an oscillation frequency from the magnetron.
Figure 3C:
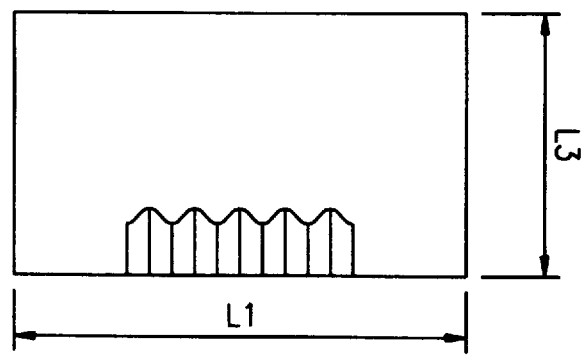
FIG. 3C is a spectrum graph illustrating a case in which respective dimensions L1, L2, L3 of the heating chamber are respectively larger than a wave length of an oscillation frequency from the magnetron.

With reference to FIGS. 4 through 7, an even heating apparatus for a microwave oven according to the present invention will be described, wherein the same reference numerals are assigned to components identical to the conventional art shown in FIGS. 1 through 3.

Figure 4:
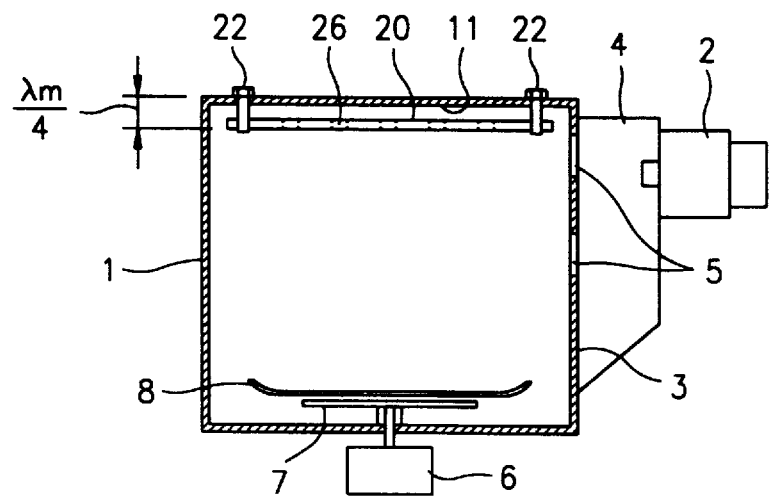
FIG. 4 is a cross-sectional view of an even heating apparatus for a microwave oven according to the present invention.

As shown in FIG. 4, the microwave oven according to the present invention includes a box-shaped heating chamber 1 on a portion of which is mounted a magnetron 2 for emitting microwave energy.

Outside a side wall 3 of the heating chamber 1 there is vertically provided a wave guide compartment 4 for guiding microwave energy emitted from the magnetron 2. Through the side wall 3 there are formed a plurality of slots 5 for introducing microwave energy therethrough. A table rotating motor 6 is provided below the bottom of the heating chamber 1. A rotation table 7 is mounted upwardly extending from the bottom of the heating chamber 1. On the upper surface of the rotation table 7 there is provided a tray 8 for accommodating food thereon.

Spaced from the ceiling of the heating chamber 1 by a distance of $\lambda_m/4$, an antenna array plate 20 is fixed as by bolts 22 to the ceiling of the heating chamber 1.

Figure 5:
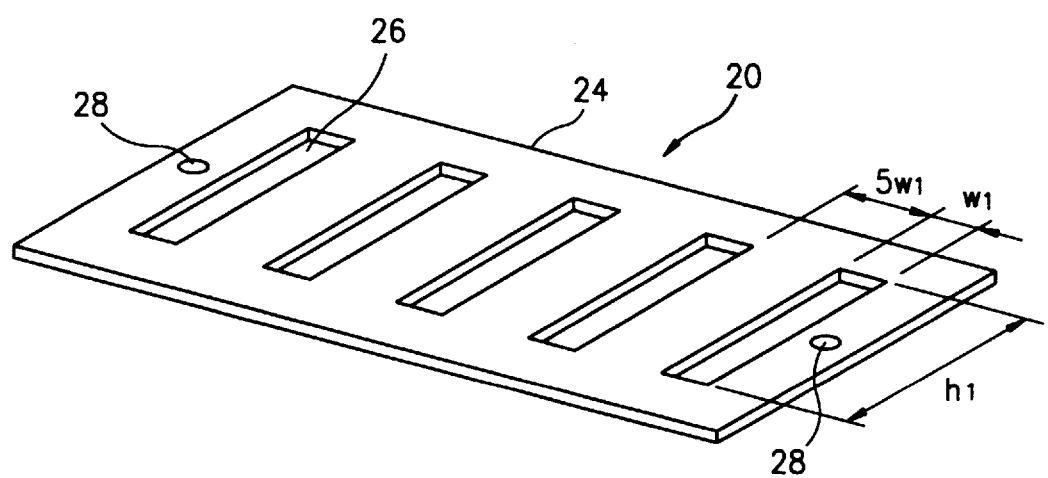
FIG. 5 is a perspective view illustrating an antenna array plate of the even heating apparatus for a microwave oven in accordance with a first embodiment of the present invention.

In particular, as shown in FIG. 5, the antenna array plate 20 includes an oblong body 24, a plurality of slit-shaped antennas 26 respectively formed therethrough perpendicularly to the longer side of the plate 20 and side by side with each other with predetermined dimensions, and holes 28 respectively formed in the body 24 for thereby receiving mounting bolts 22 therethrough. Here, the body 24 is formed of metallic material.

The slit-shaped antennas 26 are configured to satisfy the relation $2h_1+2w_1=\lambda_m$ (here, $h_1$: length, $w_1$: width, and $\lambda_m$: wave length of oscillation frequency of the magnetron 2), and the distance between the antennas is maintained to be $5w_1$.

Figure 6:
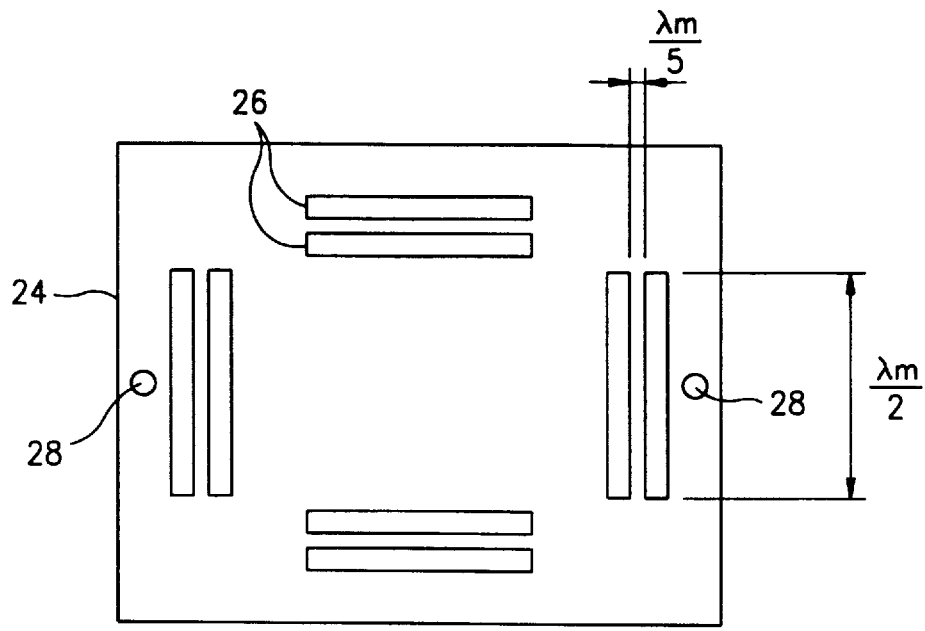
FIG. 6 is a perspective view illustrating an antenna array plate of the even heating apparatus for a microwave oven in accordance with a second embodiment of the present invention.

Referring to FIG. 6 illustrating an even heating apparatus for a microwave oven according to the second embodiment of the present invention, as shown therein, the antenna array plate 20 includes an oblong body 24, a plurality of pairs of slit-shaped antennas 26 each pair of which are formed in parallel with a corresponding one of respective edges of the body 24, and holes 28 respectively formed in the body 24 for thereby receiving mounting bolts therethrough. Here, the body 24 is formed of metallic material.

The length of the respective antennas 26 is assumed to be $\lambda_m/2$, and the distance between each pair of the antennas is maintained to be $\lambda_m/5$. Each pair of the antennas 26 is arranged parallel with its corresponding opposite one.

The antenna array plate 20 is spaced from the ceiling of the heating chamber 1 by a distance of $\lambda_m/4$, and is fixed as by mounting bolts 22 to the ceiling of the heating chamber 1.

The dimensions of the above-described antennas 26 formed in the antenna array plate 20 are designed to satisfy optimal resonance conditions in accordance with the preferred experiments.

The operation and effects of the thusly constituted even-heating apparatus for a microwave oven according to the present invention will now be described.

First, when current is applied to the magnetron 2, microwave energy is emitted from the magnetron 2, and at the same time the rotation table motor 6 and the agitation motor 9 are rotated.

The microwave energy emitted from the magnetron 2 is guided along the wave guide tube 4 and introduced through the slots 5 into the heating chamber 1. Then, the microwave energy flowing into the heating chamber 1 is rendered to a variety of resonant modes in accordance with respective antennas 26 of the antenna array plate 20, for thereby heating the food on the tray 8.

Figure 7:
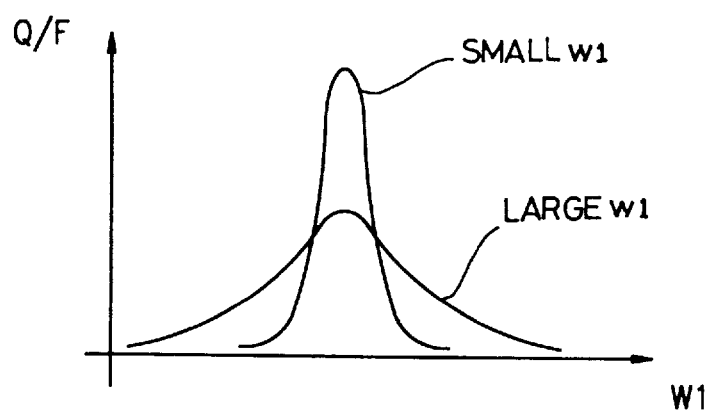
FIG. 7 is a graph of resonant mode spectrum in relation to the width of an antenna array plate of the even heating apparatus for a microwave oven in accordance with the second embodiment of the present invention.

FIG. 7 is a graph of resonant mode spectrums in relation to width of the antenna array plate 20 of the even heating apparatus for a microwave oven according to the present invention. Therein, when the width $w_1$ is relatively short, a resonant characteristic occurs at an appropriate length thereof, and when the width $w_1$ is relatively long, the degree of the resonant characteristic becomes larger. Of course, in accordance with a test result, width $w_1$ should be larger than $\lambda_m/10$ in order to obtain a characteristic appropriate to the antennas 26.

That is, in the case in which the dimensions of the antennas 26 satisfy the relation $2h_1+2w_1=\lambda_m$ (here, $h_1$: length, $w_1$: width, and $\lambda_m$: wave length of oscillation frequency of the magnetron 2), and the antenna array plate 20 is spaced from the ceiling 11 of the heating chamber 1 by $\lambda_m/4$, a variety of resonant modes are rendered to thereby evenly heat food in the heating chamber 1.

As described above, the even heating apparatus for a microwave oven according to the present invention serves to evenly heat food in the heating chamber 1 irrespective of the size or kind of the food, by fixing the antenna array plate 20 having multiple antennas 26 therein to the ceiling 11 of the heating chamber 1, for thereby enhancing the performance of a microwave oven.

What is claimed is:

1. A heating apparatus in combination with a microwave oven, wherein the microwave oven comprises a heating chamber defined in part by a side wall, a bottom wall and a ceiling and including a magnetron, the heating apparatus comprising:

a plate provided inside the heating chamber to allow microwave energy introduced into the heating chamber to form a resonant mode in the chamber when the microwave energy is introduced into the heating chamber through a waveguide and a plurality of slots formed at the side wall of the heating chamber; and the plate being formed as an antenna array plate including therein a plurality of slit-shaped antennas fixedly spaced at a distance of about $\lambda_m/4$ from the ceiling of the chamber, wherein $\lambda_m$ represents the wavelength of the magnetron.

2. The apparatus of claim 1, wherein the antenna array plate is formed of metallic material.

3. The apparatus of claim 1, wherein the antenna array plate comprises:

an oblong body;

the plurality of slit-shaped antennas formed side by side in the body perpendicularly to a longer side thereof and spaced from each other so as to respectively satisfy the relation $2h_1+2w_1=\lambda_m$ (where, $h_1$ represents length, $w_1$ represents width, and $\lambda_m$ represents the wavelength of oscillation frequency of the magnetron); and a bolt hole formed in end portions of the body.

4. The apparatus of claim 1, wherein the antenna array plate comprises a plurality of pairs of slit-shaped antennas each pair of which are formed in parallel with a corresponding one of respective sides of the body, a long-side length of the respective antennas being $\lambda_m/2$, and a distance between each pair of the antennas being $\lambda_m/5$ (where, $\lambda_m$: wave length of oscillation frequency of the magnetron).

5. The apparatus of claim 1, wherein the antenna array plate is fixedly disposed $\lambda_m/4$ from a ceiling of the heating chamber by a mounting bolt penetrating an upper shell of the chamber.

* * * * *